July 23, 1963
L. O. BAGNALL
3,098,509
RADIAL EXPANSION COMPENSATING SUPPORT FOR
THERMALLY EXPANSIBLE BODY
Filed Sept. 11, 1962
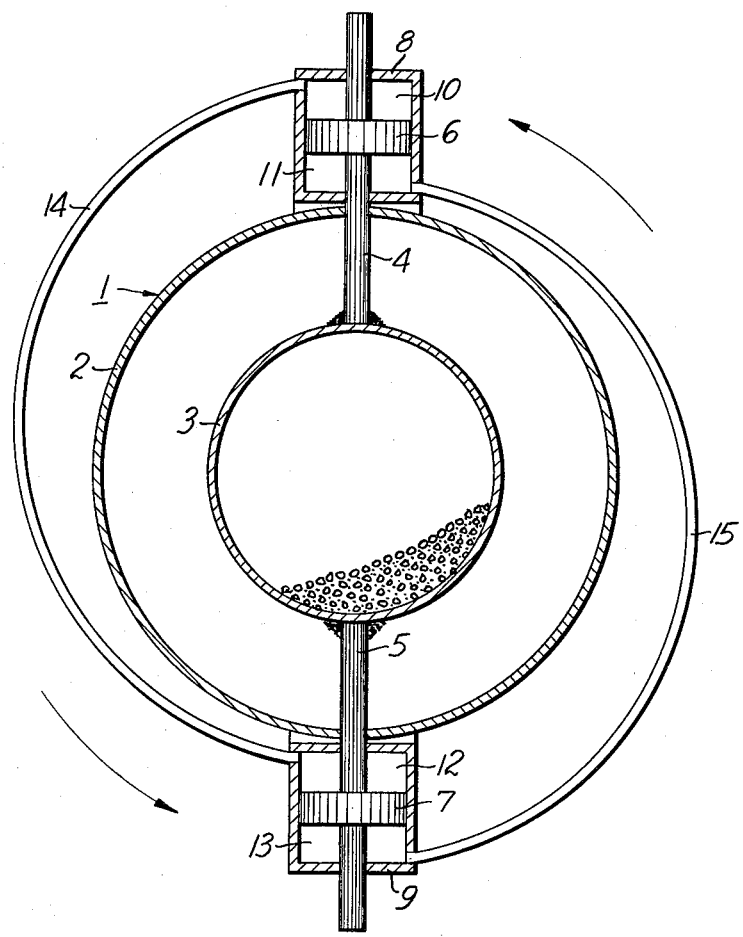
Inventor
Larry O. Bagnall
By Arthur M. Streich
Attorney

United States Patent Office 3,098,509
Patented July 23, 1963

3,098,509
RADIAL EXPANSION COMPENSATING SUPPORT
FOR THERMALLY EXPANSIBLE BODY
Larry O. Bagnall, Waukesha, Wis., assignor to Allis-
Chalmers Manufacturing Company, Milwaukee, Wis.
Filed Sept. 11, 1962, Ser. No. 222,787
6 Claims. (Cl. 138—114)

This invention relates generally to a support system for conduits, containers and the like for handling heated materials that are therefore exposed to variable temperatures that cause expansion and contraction of shell structure. More particularly, this invention relates to supporting the inner tube of a pair of concentric tubes as in double tube reducing kilns.

In reduction kilns, materials are heated in a reducing atmosphere by confining the material within a tube that is surrounded by a concentrically spaced outer combustion tube. Fuel with the necessary oxygen containing air is delivered to the combustion space between the inner and outer tubes where the mixture burns to heat the inner tube and contents thereof in a reducing atmosphere. Since the combustion gases do not actually come in contact with material to be reduced in the inner tube, sufficient air may be supplied to the combustion space to efficiently and completely burn the fuel at high temperatures. It is desirable to maintain at all times the coaxial relation of the two tubes to provide for a smooth flow and even distribution of combustion gases around the reduction tube to evenly heat the reduction tube and its contents.

Accordingly, it is an object of the present invention to provide a new and improved support system for a thermally expansible body. A more specific object of course is to provide such a new and improved support system for supporting a reduction tube in continuous concentric-coaxial alignment within a surrounding combustion tube.

According to a preferred application of the present invention to a reduction kiln, a pair of rods are secured to the outer surface of a reducing tube in a diametrically opposed arrangement to project radially outwards of the reduction tube and through a surrounding combustion tube. The portion of each rod projecting outwardly from the outer combustion tube joins a double acting piston within a cylinder mounted on the outer surface of the combustion tube. Each piston defines a chamber within its cylinder radially outward of the piston and another chamber radially inward of the piston. A first fluid transfer conduit is provided from the radially outer chamber of a first of the cylinders to the radially inner chamber of the second of the cylinders; and a second fluid transfer conduit is provided from the radially inner chamber of the first cylinder to the radially outer chamber of the second of the cylinders. Thus cross connections are provided between oppositely arranged chambers in diametrically opposite cylinders.

Each of the chambers interconnected in the manner described and the conduit therebetween is filled with a (practically speaking) incompressible fluid under such pressure as is needed to position the reducing tube concentrically within the combustion tube. The manner in which fluid pressure is balanced and equalized between the cross connected and opposed chambers to maintain coaxial alignment of the two tubes regardless of thermal expansion and contraction, can best be described with reference to the accompanying drawing which diagrammatically illustrates the present invention.

Referring to the drawing, there is shown a cross sectional view through a double concentric tube reducing kiln 1 such as may be supported, rotated (as for example counterclockwise as indicated by arrows in the drawing), fed, fired, etc. all by conventional devices, not shown. The kiln 1 has an outer combustion tube 2 surrounding an inner reducing tube 3 which is to be maintained in coaxial alignment within the combustion tube 2 by an arrangement according to the present invention, such as will be described.

The aligning and supporting arrangement for tube 3 includes rods 4, 5 secured to diametrically opposed locations on the outer surface of tube 3. Rods 4, 5 each project radially outward from tube 3 and through combustion tube 2. Pistons 6, 7 are joined to end portions of rods 4, 5, respectively, external to outer tube 2. The pistons 6, 7 are arranged within cylinders 8, 9, respectively, which are secured to and rotate with outer tube 2. Piston 6 defines a chamber 10 within cylinder 8 radially outward of piston 6. Piston 6 also defines a chamber 11 within cylinder 8 radially inward of piston 6. Likewise, piston 7 defines chambers 12 and 13 within cylinder 9. A fluid transfer conduit 14 connects chamber 10 in cylinder 8 to chamber 12 in cylinder 9. A second fluid transfer conduit 15 connects chamber 11 in cylinder 8 to chamber 13 in cylinder 9.

In the operation of the present invention, with the kiln 1 positioned to present cylinder 8 in the elevated position and cylinder 9 in the lowered position, as shown, chamber 13, conduit 15 and chamber 11 will be filled (through a suitable tap not shown) with such as a hydraulic fluid. Sufficient hydraulic pressure is admitted to and trapped within chambers 13, 11 and conduit 15 to lift tube 3 into concentric arrangement within tube 2. With a plurality of axially spaced supports of the nature described, coaxial alignment can be provided. Chamber 12, conduit 14 and chamber 10 will then be similarly filled with hydraulic fluid. The entire kiln 1 can then be slowly turned 180 degrees to reverse the positions of cylinders 8, 9. With chamber 10, conduit 14 and chamber 12 then supporting tube 3, the pressure therein can be increased to again bring tube 3 concentric to tube 2 and when this is repeated at all similar supports coaxial alignment will be achieved. The entire kiln can then be rotated and fuel and air fired in the space between tubes 2 and 3. As the inner tube 3 expands and when cylinder 9 is in the lowest position, as shown, the expansion will result in thrusting piston 7 downwardly and piston 6 upwardly thus increasing pressure in chambers 13 and 10. Not only do such forces balance each other but by the conduits 14, 15 the increased pressure under piston 7, from a downward movement thereof, provides an equalized (through conduit 15) pressure below piston 6 providing an increase in upward force. This further equalizing of radially opposite forces continues without interruption as the kiln rotates and the concentric (and coaxial) arrangement is always maintained regardless of thermal expansion and contraction of tube 3.

The described structure and operation can also be applied to nonrotating bodies. If structure such as shown in the drawing does not rotate, then conduit 14 is not needed as only the bottom chambers (11, 13 when positioned, i.e., as shown) in cylinders 8, 9 need be interconnected.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are, or may hereafter be, appended hereto.

Having now particularly described and ascertained the nature of my said invention and the manner in which it is to be performed, I declare that what I claim is:

1. An expansion compensating support assembly comprising first and second cylinders, a piston in each of said cylinders dividing each cylinder into a pair of spaced chambers, a rod connected to each piston with at least a first end of each such rod projecting outwardly from its cylinder, said cylinders being positioned relative to each other with said first end portions of each rod projecting from each cylinder in a facing spaced relation to each other for engaging and supporting a thermally expansible body therebetween, each of said chambers being filled with a hydraulic relatively incompressible fluid, the chamber in said first cylinder in close proximity to said first end of the rod projecting therefrom being hydraulically connected to the remote chamber in said second cylinder, and the chamber in said second cylinder in close proximity to said first end of the rod projecting therefrom being hydraulically connected to the remote chamber in said first cylinder.

2. An expansion compensating support assembly comprising first and second cylinders, a piston in each of said cylinders dividing each cylinder into a pair of spaced chambers, a rod connected to each piston with at least a first end of each such rod projecting outwardly from its cylinder, said cylinders being positioned with one above the other end and with said first end portions of each rod projecting vertically from each cylinder toward each other and a facing and spaced relation to each other for engaging and supporting a thermally expansible body therebetween, the bottom chamber in each cylinder being filled with a hydraulic relatively incompressible fluid, and a conduit connecting each of said bottom chambers to equalize fluid pressure therein.

3. In an assembly having an inner tube arranged coaxially within an outer tube, an expansion compensating inner tube support assembly for maintaining the inner tube coaxial with the outer tube regardless of expansion and contraction, said support comprising first and second cylinders secured to diametrically opposite locations on the outer tube, a piston in each of said cylinders dividing each cylinder into a pair of spaced chambers, a rod connected to each piston with at least a first end of each such rod projecting outwardly from its cylinder and radially inward of the outer tube for engaging and supporting the inner tube therebetween, each of said chambers being filled with a hydraulic relatively incompressible fluid, the chamber in said first cylinder in close proximity to the said first end of the rod projecting therefrom being hydraulically connected to the remote chamber in said second cylinder, and the chamber in said second cylinder in close proximity to said first end of the rod projecting therefrom being hydraulically connected to the remote chamber in said first cylinder.

4. An expansion compensating support assembly comprising first and second fluid operated motors each having a part comprising a cylinder and a part comprising a piston in each of said cylinders with each piston dividing each cylinder into a pair of spaced chambers, said motors being positioned apart from each other to define a space therebetween and with the central axis of each cylinder converging toward each other and said space, said motors thus being spaced for engaging a thermally expansible body therebetween with one part of each motor, each of said chambers being filled with a hydraulic relatively incompressible fluid, the chamber in said first motor in close proximity to said space being hydraulically connected to the remote chamber in said second motor, and the chamber in said second motor in close proximity to said space being hydraulically connected to the remote chamber in said first motor.

5. An expansion compensating support assembly comprising first and second fluid operated motors each having a part comprising a cylinder and a part comprising a piston in each of said cylinders with each piston dividing each cylinder into a pair of spaced chambers, said motors being positioned apart with one above the other and with the central axis of each cylinder being vertical, said motors thus being spaced for engaging a thermally expansible body therebetween with one part of each motor, the bottom chamber in each motor being filled with a hydraulic relatively incompressible fluid, and a conduit connecting each of said bottom chambers to equalize fluid pressure therein.

6. In an assembly having an inner tube arranged coaxially within an outer tube, an expansion compensating inner tube support assembly for maintaining the inner tube coaxial with the outer tube regardless of expansion and contraction, said support comprising first and second fluid operated motors each having a part comprising a radially extending cylinder secured to diametrically opposite locations on the outer tube, each motor also having a part comprising a piston in each of said cylinders dividing each cylinder into a pair of spaced chambers, one of said parts of each said motor being secured to said outer tube and the other part of each motor being secured to said inner tube for supporting the inner tube within the outer tube, each of said chambers being filled with a hydraulic relatively incompressible fluid, the chamber in said first motor in close proximity to the inner tube being hydraulically connected to the remote chamber in said second motor, and the chamber in said second motor in close proximity to the inner tube being hydraulically connected to the remote chamber in said first motor.

No references cited.